(12) United States Patent
Vedula et al.

(10) Patent No.: US 10,757,196 B2
(45) Date of Patent: Aug. 25, 2020

(54) METHOD AND APPARATUS FOR DISPLAYING APPLICATION DATA IN WIRELESS COMMUNICATION SYSTEM

(71) Applicant: Samsung Electronics Co., Ltd., Gyeonggi-do (KR)

(72) Inventors: Kiran Bharadwaj Vedula, Bangalore (IN); In-Young Shin, Seoul (KR)

(73) Assignee: Samsung Electronics Co., Ltd (KR)

( * ) Notice: Subject to any disclaimer, the term of this patent is extended or adjusted under 35 U.S.C. 154(b) by 259 days.

(21) Appl. No.: 14/635,443

(22) Filed: Mar. 2, 2015

(65) Prior Publication Data
US 2015/0249714 A1     Sep. 3, 2015

Related U.S. Application Data

(60) Provisional application No. 61/946,151, filed on Feb. 28, 2014.

(51) Int. Cl.
*H04L 29/08* (2006.01)
*H04L 29/06* (2006.01)
*H04W 4/80* (2018.01)

(52) U.S. Cl.
CPC ........ *H04L 67/141* (2013.01); *H04L 65/4015* (2013.01); *H04L 65/608* (2013.01);
(Continued)

(58) Field of Classification Search
None
See application file for complete search history.

(56) References Cited

U.S. PATENT DOCUMENTS

| 7,934,010 B2* | 4/2011 | Foster | H04L 29/06027 709/230 |
| 8,386,632 B2* | 2/2013 | Wang | H04N 21/2387 709/231 |

(Continued)

FOREIGN PATENT DOCUMENTS

| CN | 1747512 | 3/2006 |
| CN | 102833876 | 12/2012 |

(Continued)

OTHER PUBLICATIONS

International Search Report dated May 26, 2015 issued in counterpart application No. PCT/KR2015/001983.

(Continued)

*Primary Examiner* — Chris Parry
*Assistant Examiner* — Abderrahmen Chouat
(74) *Attorney, Agent, or Firm* — The Farrell Law Firm, P.C.

(57) ABSTRACT

Provided is a method for displaying application data in a wireless communication system, the method including transmitting, by a first device, audio and video data out of application data executed by the first device to a second device in a Wireless Fidelity (Wi-Fi) Display (WFD) session, if the WFD session is established through discovery between the first device and the second device, transmitting, by the first device, text or Graphic User Interface (GUI) data related to the transmitted audio and video data, to the second device in a session that is different from the WFD session, and receiving, by the first device, a close command for the application data and sending a message comprising a set parameter for stopping display of the text or GUI data to the second device.

4 Claims, 3 Drawing Sheets

SOURCE

SINK

(52) U.S. Cl.
CPC .............. *H04L 67/04* (2013.01); *H04L 67/06* (2013.01); *H04L 67/1097* (2013.01); *H04L 67/125* (2013.01); *H04L 67/2823* (2013.01); *H04W 4/80* (2018.02)

(56) References Cited

U.S. PATENT DOCUMENTS

| | | | |
|---|---|---|---|
| 2003/0210252 A1 | 11/2003 | Ludtke et al. | |
| 2004/0055011 A1 | 3/2004 | Bae et al. | |
| 2006/0080456 A1* | 4/2006 | Hur | H04L 29/06027 709/231 |
| 2006/0272000 A1 | 11/2006 | Kwak et al. | |
| 2007/0136777 A1* | 6/2007 | Hasek | H04N 7/17318 725/114 |
| 2008/0104656 A1 | 5/2008 | Kim | |
| 2008/0198930 A1 | 8/2008 | Matsubayashi | |
| 2010/0295992 A1 | 11/2010 | Lee et al. | |
| 2011/0107388 A1* | 5/2011 | Lee | H04N 21/43615 725/118 |
| 2011/0261889 A1 | 10/2011 | Francisco | |
| 2012/0192064 A1 | 7/2012 | Antebi et al. | |
| 2012/0243524 A1 | 9/2012 | Verma et al. | |
| 2013/0003624 A1 | 1/2013 | Huang et al. | |
| 2013/0067331 A1* | 3/2013 | Glazer | H04L 65/1069 715/719 |
| 2013/0185391 A1* | 7/2013 | Suneya | H04L 67/02 709/217 |
| 2013/0185447 A1 | 7/2013 | Nagawade et al. | |
| 2013/0219072 A1* | 8/2013 | Han | H04L 65/60 709/228 |
| 2014/0003516 A1* | 1/2014 | Soroushian | H04N 21/2387 375/240.13 |
| 2014/0320925 A1 | 10/2014 | Shibata et al. | |
| 2014/0334381 A1 | 11/2014 | Subramaniam et al. | |
| 2014/0376892 A1* | 12/2014 | Yamamoto | H04N 5/91 386/349 |
| 2016/0142865 A1* | 5/2016 | Park | H04L 65/1083 455/41.1 |

FOREIGN PATENT DOCUMENTS

| | | |
|---|---|---|
| EP | 2 209 280 | 7/2010 |
| JP | 2001184188 | 7/2001 |
| JP | 2001298676 | 10/2001 |
| JP | 2002518947 | 6/2002 |
| JP | 2006129103 | 5/2006 |
| JP | 2006333460 | 12/2006 |
| JP | 2008131569 | 6/2008 |
| JP | 2010-516078 | 5/2010 |
| JP | 2010252215 | 11/2010 |
| JP | 2016521518 | 7/2016 |
| KR | 1020070065656 | 6/2007 |
| KR | 1020080037474 | 4/2008 |
| KR | 1020130091104 | 8/2013 |
| WO | WO 2009/130840 | 10/2009 |
| WO | WO 2012/106644 | 8/2012 |

OTHER PUBLICATIONS

European Search Report dated Sep. 5, 2017 issued in counterpart application No. 15755501.2-1853, 7 pages.
Chinese Office Action dated Oct. 12, 2018 issued in counterpart application No. 201580023227.0, 11 pages.
Japanese Office Action dated Oct. 22, 2018 issued in counterpart application No. 2016-554409, 10 pages.
Wi-Fi Alliance, Wi-Fi Display Technical Specification, Wi-Fi Alliance Technical Committee, Wi-Fi Display Technical Task Group, Version 1.0.0, Aug. 24, 2012, 16 pages.

* cited by examiner

METHOD AND APPARATUS FOR DISPLAYING APPLICATION DATA IN WIRELESS COMMUNICATION SYSTEM

PRIORITY

This patent application claims priority under 35 U.S.C. §119(e) to Patent Application filed in the United States Patent and Trademark Office on Feb. 28, 2014 and assigned Ser. No. 61/946,151, the content of which is incorporated herein by reference.

TECHNICAL FIELD

The present disclosure relates to a method and apparatus for playing contents shared between devices in a wireless communication system.

BACKGROUND

The Wireless Fidelity (Wi-Fi) Display (WFD) standard has been specified according to needs for transmitting Audio/Video (AV) data while satisfying high quality and low latency. A WFD network to which the WFD standard is applied is a network system proposed by the Wi-Fi Alliance which enables Wi-Fi devices to be connected to each other in a peer-to-peer manner without joining a home network, an office network, or a hotspot network. The WFD devices in the WFD network search for information about each other, for example, capability information, establish a WFD session, and render contents received during the WFD session.

The WFD network includes two types of devices, for example, a source device and a sink device. The source device mirrors data existing on a source screen onto a screen of the sink device. The source device and the sink device exchange a first sequence message with each other and perform device discovery and service discovery. After completion of device discovery and service discovery, an Internet Protocol (IP) address is allocated to the source device and the sink device. Transmission Control Protocol (TCP) connection is established between the source device and the sink device, and then Real Time Streaming Protocol (RTSP) and Real Time Protocol (RTP) stacks for the source device and the sink device are activated.

Capability negotiation between the source device and the sink device is performed through the RTSP, and during capability negotiation, the source device and the sink device exchange M1 through M4 messages. Thereafter, the source device and the sink device exchange WFD session control messages. A data session is established between the source device and the sink device through the RTP.

In the WFD network, a User Datagram Protocol (UDP) is used for data transport. The UDP has no reliability, such that during wireless transmission, some packets may be lost. Since the lost packets are not retransmitted, a loss of data may be noticed by a user. In particular, a data loss related to a text, such as a subtitle, or a Graphic User Interface (GUI) is more noticeable to the user than AV data. Thus, a need exists for a scheme for improving the quality of text and GUI data in the sink device.

To reduce noticeable distortion in the quality of the text and GUI-related data in the sink device, the sink device merges the AV data with the text and GUI-related data, instead of the source device merging the AV data with the text and GUI-related data and transmitting the merged data to the sink device. To merge the text such as a subtitle with the AV data in the sink device, techniques such as Synchronized Multimedia Integration Language (SMIL) or Timed Text Markup Language (TTML) may be used. Likewise, to merge the GUI data with the AV data in the sink device, techniques such as Remote View (RVU), Hyper Text Markup Language (HTML) 5, or Consumer Electronics (CE)-HTML may be used.

The above information is presented as background information only to assist with an understanding of the present disclosure. No determination has been made, and no assertion is made, as to whether any of the above might be applicable as prior art with regard to the present disclosure.

SUMMARY

An aspect of the present disclosure is to address at least the above-mentioned problems and/or disadvantages and to provide at least the advantages described below. Accordingly, an aspect of the present disclosure is to provide a method and apparatus for merging Audio/Video (AV) data with a text or Graphic User Interface (GUI) data in a sink device.

Another aspect of the present disclosure is to provide a method and apparatus for synchronization in a sink device when merging AV data with a text or GUI data.

In accordance with an aspect of the present disclosure, there is provided a method for displaying application data in a wireless communication system, the method including transmitting, by a first device, audio and video data out of application data executed by the first device to a second device in a Wireless Fidelity (Wi-Fi) Display (WFD) session, if the WFD session is established through discovery between the first device and the second device, transmitting, by the first device, text or Graphic User Interface (GUI) data related to the transmitted audio and video data, to the second device in a session that is different from the WFD session, and receiving, by the first device, a close command for the application data and sending a message including a set parameter for stopping display of the text or GUI data to the second device.

In accordance with another aspect of the present disclosure, there is provided a method for displaying application data in a wireless communication system, the method including receiving, by a first device, audio and video data out of application data executed by a second device from a second device in a Wireless Fidelity (Wi-Fi) Display (WFD) session, if the WFD session is established through discovery between the first device and the second device, receiving, by the first device, text or Graphic User Interface (GUI) data related to the received audio and video data, from the second device in a session that is different from the WFD session, merging and displaying, by the first device, the received audio and video data with the text or GUI data, and receiving, by the first device, a message including a set parameter for stopping display of the text or GUI data from the second device and stopping display of the text or GUI data, upon receiving, by the second device, a close command for the application data.

In accordance with another aspect of the present disclosure, there is provided a method for displaying application data in a wireless communication system, the method including transmitting, by a first device, a file including text data out of application data executed by the first device to a second device and parsing, by the first device, the file to acquire timing information regarding the text data and transmitting audio and video data out of the application data and packet data including the acquired timing information to the second device in a Wireless Fidelity (Wi-Fi) Display (WFD) session.

In accordance with another aspect of the present disclosure, there is provided a method for displaying application data in a wireless communication system, the method including receiving, by a first device, a file including text data out of application data executed by a second device from the second device, receiving, by the first device, audio and video data out of the application data and packet data including the acquired timing information from the second device in a Wireless Fidelity (Wi-Fi) Display (WFD) session, and decoding, by the first device, the packet data to detect the timing information, comparing the detected timing information with timing information included in the file received from the second device, and displaying the audio and video data and text data corresponding thereto based on a result of the comparing.

In accordance with another aspect of the present disclosure, there is provided a device for displaying application data in a wireless communication system, the device including a transmitter/receiver configured transmit audio and video data out of application data executed by the first device to another device in a Wireless Fidelity (Wi-Fi) Display (WFD) session, if the WFD session is established through discovery with the another device, to transmit text or Graphic User Interface (GUI) data related to the transmitted audio and video data, to the another device in a session that is different from the WFD session, and to receive a close command for the application data and send a message including a set parameter for stopping display of the text or GUI data to the another device, and a controller configured to control the transmitter/receiver and to set up connection with the another device.

In accordance with another aspect of the present disclosure, there is provided a device for displaying application data in a wireless communication system, the device including a transmitter/receiver configured to receive audio and video data out of application data executed by another device from the another device in a Wireless Fidelity (Wi-Fi) Display (WFD) session, if the WFD session is established through discovery with the another device, to receive text or Graphic User Interface (GUI) data related to the received audio and video data, from the another device in a session that is different from the WFD session, and to receive a message including a set parameter for stopping display of the text or GUI data from the another device upon receiving, by the another device, a close command for the application data and a controller configured to merge and display the received audio and video data with the text or GUI data, to stop display of the text or GUI data upon receiving the message including the set parameter from the another device, and to set up connection with the another device.

In accordance with another aspect of the present disclosure, there is provided a device for displaying application data in a wireless communication system, the device including a transmitter/receiver configured to transmit a file including text data out of currently executed application data to another device, to parse the file to acquire timing information regarding the text data and transmit audio and video data out of the application data and packet data including the acquired timing information to the another device in a Wireless Fidelity (Wi-Fi) Display (WFD) session and a controller configured to control the transmitter/receiver.

In accordance with another aspect of the present disclosure, there is provided a device for displaying application data in a wireless communication system, the device including a transmitter/receiver configured to receive a file including text data out of application data executed by another device from the another device, to receive audio and video data out of the application data and packet data including the acquired timing information from the another device in a Wireless Fidelity (Wi-Fi) Display (WFD) session and a controller configured to decode the packet data for detecting the timing information, to compare the detected timing information with timing information included in the file received from the another device, to display the audio and video data and text data corresponding thereto based on a result of the comparing, and to control the transmitter/receiver.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features and advantages of certain exemplary embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
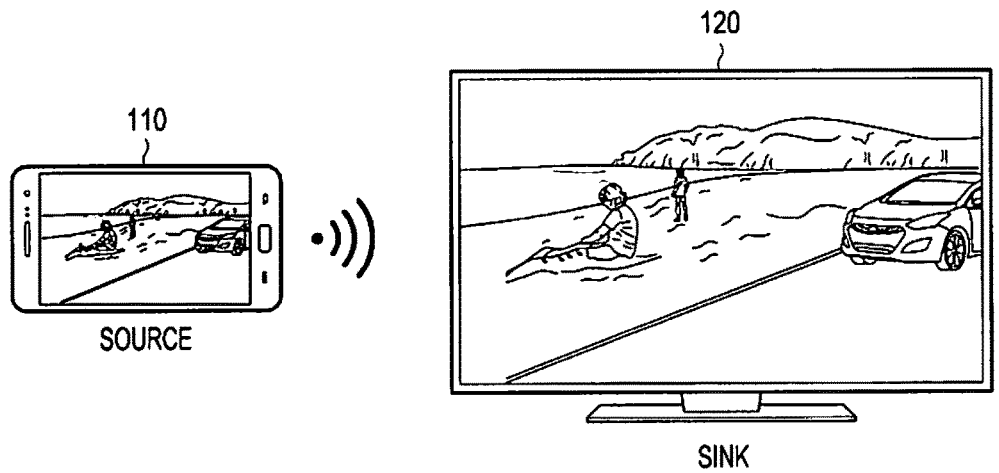
FIG. 1 schematically illustrates a system for sharing contents between WFD devices according to an embodiment of the present disclosure.

Hereinafter, certain exemplary embodiments of the inventive concept will be described in detail with reference to the accompanying drawings. The matters defined herein, such as a detailed construction and elements thereof, are provided to assist in a comprehensive understanding of this description. Thus, it is apparent that exemplary embodiments may be carried out without those defined matters. Also, terms that will be described later in the present disclosure are defined by considering functions in the present inventive concept, and may vary depending on an operator's or user's intention or practice. Therefore, the definition of the terms will be made based on information throughout this disclosure.

The present disclosure may be variously modified and realized in various forms, and thus specific embodiments will be exemplified in the drawings and described in detail hereinbelow. However, the present disclosure is not limited to the specific disclosed forms, and needs to be construed to include all modifications, equivalents, or replacements included in the spirit and technical range of the present disclosure.

While terms including ordinal numbers such as a first and a second may be used to describe various components, such components are not limited to the terms. The terms are used only for the purpose of distinguishing one component from other components. For example, a second component may be named as a first component without departing from the scope of the present disclosure, and in a similar way, the first component may be renamed as the second component. The term and/or includes a combination of a plurality of related items or any one of the plurality of related items.

The terms used herein are to explain only specific embodiments, and are not intended to limit the present disclosure. A singular expression covers a plural expression unless it is definitely used in a different way in the context. It should be understood that the terms "comprising", "including", and "having" use herein are intended to denote a feature, a number, a step, an operation, an element, a part, and a combination thereof described herein, but not to exclude one or more features, numbers, steps, operations, elements, parts, and combinations thereof.

Unless otherwise defined, the terms used herein including technical or scientific terms have the same meanings as those understood by those skilled in the art to which the present disclosure pertains. The terms generally defined in dictionaries should be construed to have meanings in agreement with those in the contexts of the related technology, and not construed as ideal or excessively formal meanings unless definitely defined herein.

FIG. 1 schematically illustrates a system (or a WFD system) for sharing contents between Wireless Fidelity (Wi-Fi) Display (WFD) devices according to an embodiment of the present disclosure.

Referring to FIG. 1, the WFD system includes a source device 110 and a sink device 120.

The source device 110 may be a portable device having a relatively small screen, such as a mobile communication device, a smartphone, a tablet Personal Computer (PC), a Portable Multimedia Player (PMP), a Personal Digital Assistant (PDA), or the like.

The source device 110 forms a communication channel for wirelessly transmitting multimedia contents with the sink device 120. For example, the communication channel may include a Miracast session. More specifically, the source device 110 transmits multimedia contents and a control command to the sink device 120 through the communication channel. The communication channel may be a communication channel based on a Transmission Control Protocol (TCP) or a User Datagram Protocol (UDP). In particular, if WFD is provided between the source device 110 and the sink device 120 in the communication system according to an embodiment of the present disclosure, a streaming protocol between the source device 110 and the sink device 120 is defined in a forward channel.

That is, the source device 110 may transmit multimedia contents and a control command to the sink device 120 on a real-time basis, upon being connected with the sink device 120 through the communication channel. More specifically, the source device 110 converts the multimedia contents into a stream form and transmits the multimedia contents converted into the stream form to the sink device 120 through the communication channel. The source device 110 transmits the control command to the sink device 120 through the communication channel. The control command is a command for controlling playback of the multimedia contents. For example, the control command may include Volume Control, Pause, Resume, Stop, Rewind, and the like. The source device 110 may transmit text or Graphic User Interface (GUI) data, separately from transmission of Audio/Video (AV) data, to the sink device 120.

The sink device 120 may be an electronic device having a relatively large screen, such as a desktop PC, a laptop, a smart Television (TV), or the like. The sink device 120 receives the multimedia contents converted into the stream form from the source device 110 through the communication channel, and inversely converts and plays the received multimedia contents. The sink device 120 merges and displays the AV data and the text or GUI data transmitted from the source device 110. The sink device 120 receives the control command from the source device 110 and performs a function corresponding to the control command.

Although one sink device is illustrated in FIG. 1, the present disclosure is not limited to this example, and the present disclosure may also be applied when two or more sink devices exist. For convenience, the following description will be made using an example where there is one sink device.

A text or a GUI is generally related to a program that is being currently played. When AV data and text or GUI data are merged in a sink device, there are an AV session (or a Miracast session) for the AV data and a session for the text or GUI data. An operation in the source device needs to be reflected in the sink device, and the sink device needs to synchronize the AV data with the text/GUI data. That is, the operation in the source device has to be displayed in temporal synchronization with the AV session and has to be displayed when the AV session for corresponding programs is ongoing. Multiple programs may be launched and closed in the source device during an effective time of the Miracast session, and a text/GUI related to a program has to be closed when the program is closed. The program may be closed in the source device by user's input of a close button or a back button. Thus, a mechanism is needed for the source device to inform the sink device that the sink device needs to close a program each time when an operation related to closing of the program is performed in the source device.

Figure 2:
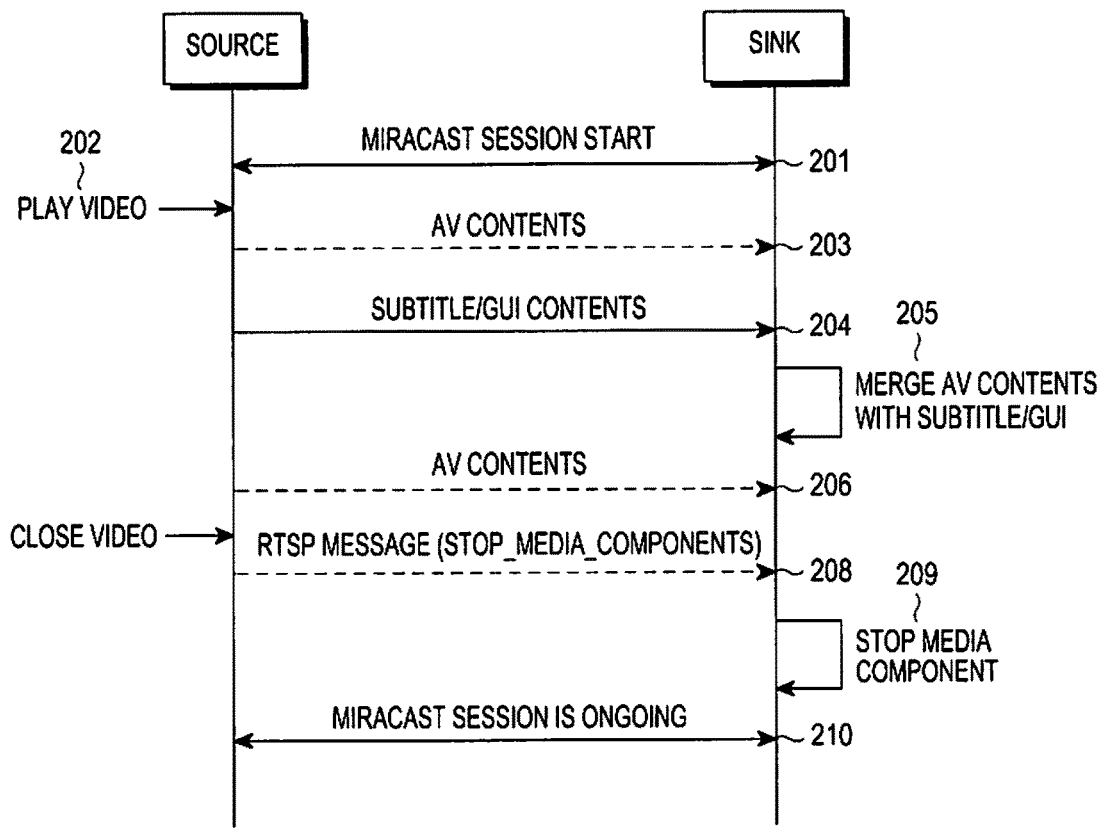
FIG. 2 illustrates a series of processes for synchronization between a source device and a sink device according to an embodiment of the present disclosure.

FIG. 2 illustrates a series of processes for synchronization between a source device and a sink device according to an embodiment of the present disclosure.

Referring to FIG. 2, a source device and a sink device discover each other and start a Miracast session in operation 201. In the source device, a user executes a program such as a video player and inputs a command for playing a video in operation 202. The source device delivers corresponding AV contents to the sink device in the Miracast session in operation 203. The source device delivers subtitle/GUI contents to the sink device in a session (for example, a File Transfer Protocol (FTP)) separate from the Miracast session in operation 204. The subtitle/GUI contents may be delivered by adding a new media component to Moving Picture Experts Group (MPEG) packets for the Miracast session. The sink device merges and displays the subtitle/GUI contents with the already received AV contents in operation 205. During the Miracast session, the source device transmits the AV contents to the sink device.

Upon input of a command for terminating a currently executed video from the user to the source device in operation 207, the source device sends an RTSP message including a new set parameter "stop_media_components" for stopping media components to the sink device in operation 208. Then, the sink device stops the media components such as currently displayed GUI/text according to the RTSP message received from the source device in operation 209.

Thereafter, the Miracast session may be ongoing and the user may start another AV application in the source device in operation 210.

The text/GUI contents may be delivered in the form of SMIL/TTML, and SMIL/TTML files are played based on time synchronization only in SMIL/TTML, without considering timing of video files. As a result, when the sink device displays a text, the text may be displayed without being synchronized with the AV contents. This problem occurs because the same contents are streamed from one device to another device. Thus, the WFD network needs to synchronize play timing of an SMIL file with timing of video contents.

Therefore, an embodiment of the present disclosure proposes a method for, by the source device, inserting text timing information (SMIL/TTML timing information) into MPEG packets of AV contents for transmission to the sink device. The timing information is information indicating when to detect which SMIL/TTML when the sink device renders contents.

Figure 3:
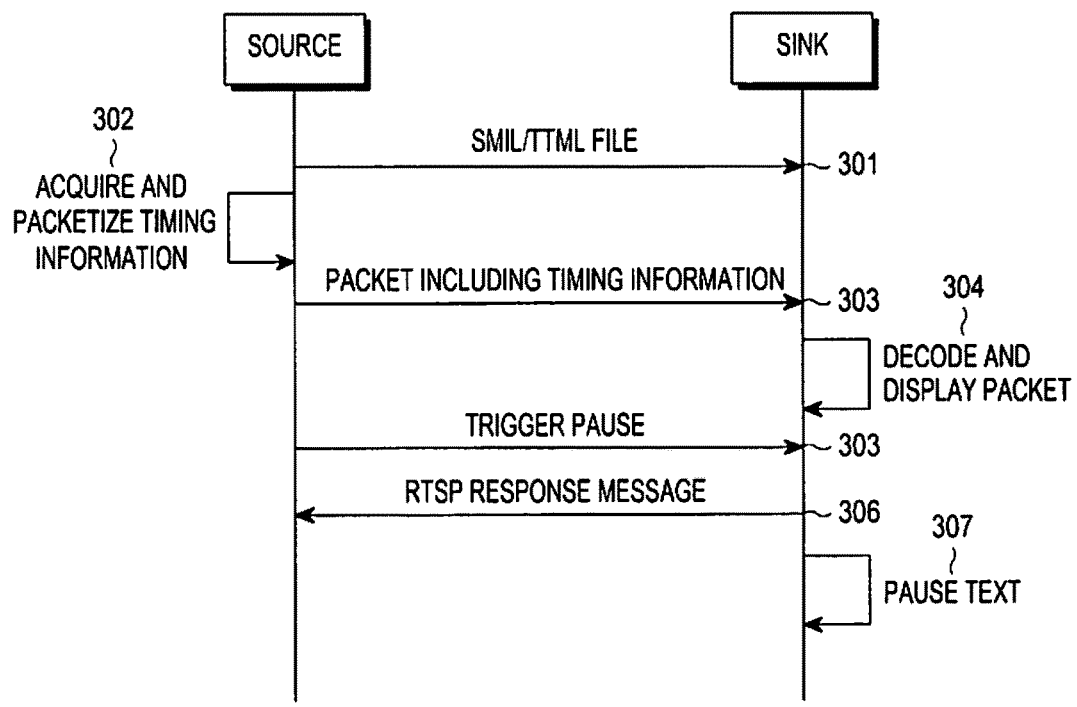
FIG. 3 illustrates a series of processes for synchronization between a source device and a sink device according to another embodiment of the present disclosure.

FIG. 3 illustrates a series of processes for synchronization between a source device and a sink device according to another embodiment of the present disclosure.

Referring to FIG. 3, the source device delivers an SMIL/TTML file including a text to the sink device in operation 301. The SMIL/TTML file includes timing information regarding when to display which text. The source device parses the SMIL/TTML file delivered to the sink device and acquires the timing information regarding the text. Thereafter, as a part of a Miracast session operation, the source device captures a screen and packetizes captured screen information. During packetization, the source device incorporates the timing information acquired from the SMIL/TTML file into a packet in operation 302. The source device delivers the packet (for example, am MPEG2-TS) including the timing information to the sink device in operation 303. The sink device then decodes the packet to detect the SMIL/TTML timing information. The sink device parses an already received SMIL/TTMl file and compares timing information included in the SMIL/TTML file with the detected timing information to detect a corresponding text and display the text together with AV data in operation 304. If the user inputs a pause command to the source device, the source device transmits a trigger for pause to the sink device in operation 305. The sink device sends an RTSP message to the source device in response to the pause in operation 306 and pauses a currently displayed text in operation 307.

Figure 4:
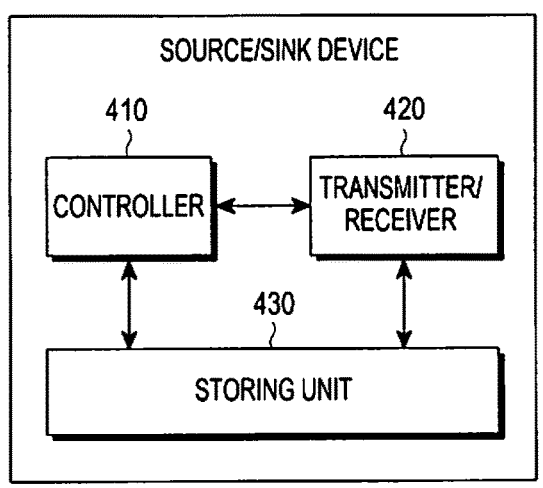
FIG. 4 is a block diagram of a source device and a sink device for synchronization between the source device and the sink device according to an embodiment of the present disclosure.

FIG. 4 is a block diagram of a source device and a sink device for synchronization between the source device and the sink device according to an embodiment of the present disclosure.

Referring to FIG. 4, the source device and the sink device may include a controller 410, a transmitter/receiver 420, and a storing unit 430. Although one device is illustrated in FIG. 4 for convenience, the source device and the sink device may be separate devices as would be obvious to those of ordinary skill in the art.

The controller 410 controls the transmitter/receiver 420 and the storing unit 430 for a series of operations for synchronization between devices according to an embodiment of the present disclosure. An overall operation related to the control operation is the same as the operation which has been already described with reference to FIGS. 2 and 3, and thus will not be described in detail at this time.

The transmitter/receiver 420 transmits and receives data, a message, a signal, and the like between the source device and the sink device for synchronization between devices according to an embodiment of the present disclosure under control of the controller 410. The storage unit 430 stores data to be transmitted to a counterpart device or data received from the counterpart device. An overall operation related to the storage operation is the same as the operation which has been already described with reference to FIGS. 2 and 3, and thus will not be described in detail at this time.

Although not shown in FIG. 4, an input unit for receiving a user's command and a display for displaying contents may be further included in the source device and the sink device. The input unit and the display unit may be configured as one unit depending on a device type. In particular, an input unit included in the source device 110 and an input unit included in the sink device may include multiple input keys and function keys for receiving number or character information and setting and controlling functions, and may be formed by any one of input means, such as a touch key, a touch pad, and a touch screen, or a combination thereof.

Figure 5:
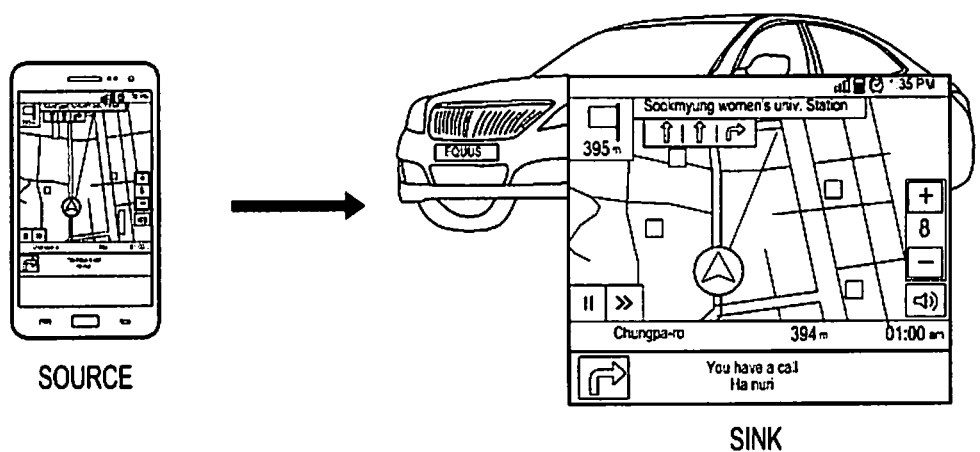
FIGS. 5 and 6 illustrate an example of synchronization between a source device and a sink device according to an embodiment of the present disclosure.
Figure 6:
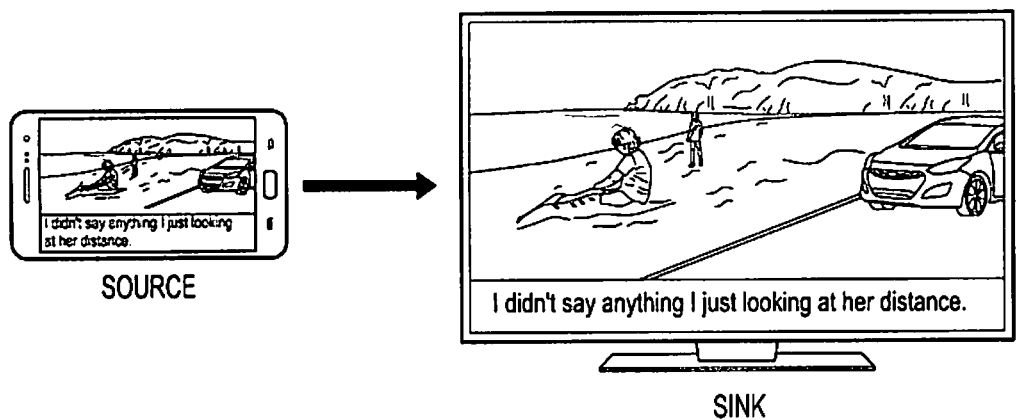

FIGS. 5 and 6 illustrate an example of synchronization between a source device and a sink device according to an embodiment of the present disclosure.

FIG. 5 shows a case where a smartphone as a source device executes a navigation application and transmits a navigation execution screen as contents to a screen in a vehicle as a sink device. The navigation program displays a text for detailed road guidance and a GUI for setting road guiding conditions, together with a map image, on the screen. In this case, by applying the method for synchronization according to an embodiment of the present disclosure described in FIGS. 2 and 3, the text and the GUI data displayed on the screen in the vehicle may be displayed without any loss.

FIG. 6 shows a case where a smartphone as a source device executes a video play program and transmits contents to a screen of a TV as a sink device. Contents such as a movie include subtitle data, together with video and audio data. In this case, by applying the method for synchronization according to an embodiment of the present disclosure described with reference to FIGS. 2 and 3, subtitles may be displayed on the screen of the TV without distortion, or may be synchronized with the video and audio data.

Certain aspects of the present disclosure can also be embodied as computer readable code on a computer readable recording medium. A computer readable recording medium is any data storage device that can store data which can be thereafter read by a computer system. Examples of the computer readable recording medium include read-only memory (ROM), random-access memory (RAM), Compact Disc (CD)-Read Only Memories (ROMs), magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present disclosure can be easily construed by programmers skilled in the art to which the present disclosure pertains.

An apparatus and method according to an embodiment of the present disclosure may be implemented by hardware, software, or a combination of hardware and software. Such software may be stored, whether or not erasable or re-recordable, in a volatile or non-volatile storage such as a ROM, a memory such as a RAM, a memory chip, a device, or an integrated circuit; and an optically or magnetically recordable and machine (e.g., computer)-readable storage medium such as a CD, a Digital Versatile Disk (DVD), a magnetic disk, or a magnetic tape. It can be seen that the method according to the present disclosure may be implemented by a computer or a portable terminal which includes a controller and a memory, and the memory is an example of a machine-readable storage medium which is suitable for storing a program or programs including instructions for implementing the embodiment of the present disclosure.

Therefore, the present disclosure includes a program including codes for implementing an apparatus or method claimed in an arbitrary claim and a machine(computer)-readable storage medium for storing such a program. The program may be electronically transferred through an arbitrary medium such as a communication signal delivered through a wired or wireless connection, and the present disclosure properly includes equivalents thereof.

The apparatus according to an embodiment of the present disclosure may receive and store the program from a program providing device connected in a wired or wireless manner. The program providing device may include a memory for storing a program including instructions for instructing a program processor to execute a preset contents protection method, information necessary for contents protection, a communication unit for performing wired or wireless communication with a graphic processor, and a controller for transmitting a corresponding program to a transceiver at the request of the graphic processor or automatically.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. A method for displaying data in a wireless communication system, the method comprising:
    establishing a first session corresponding to a wifi display session between a first device and a second device;
    establishing a second session other than the first session between the first device and the second device;
    displaying, by the first device, application data including graphic user interface (GUI) data and playing multimedia content, with the multimedia content comprising audio data and video data, and the GUI data being associated with the video data;
    transmitting, by the first device, a synchronized multimedia integration language (SMIL) file including the GUI data and timing information associated with the GUI data and the multimedia content, to the second device through the second session;
    after transmission of the SMIL file to the second device, generating, by the first device, one or more packets by packetizing the multimedia content currently being displayed by the first device and inserting timing information associated with the SMIL file into the one or more packets;
    transmitting, by the first device, the one or more packets to the second device through the first session;
    decoding, by the second device, the one or more packets to detect the timing information;
    parsing, by the second device, the SMIL file and extracting the timing information associated with the GUI data and the multimedia content;
    comparing, by the second device, the extracted timing information with timing information of the one or more packets;
    merging and displaying, by the second device, the multimedia content and the GUI data based on comparing the timing information included in the SMIL with the timing information inserted into the one or more packets; and
    transmitting, by the first device, a message comprising a set parameter for stopping display of the GUI data to the second device in response to detecting a command for stopping play of the multimedia content at the first device.

2. A method for displaying data in a wireless communication system, the method comprising:
    establishing a first session corresponding to a wifi display session between a first device and a second device;
    establishing a second session other than the first session between the first device and the second device;
    receiving, by the first device, a synchronized multimedia integration language (SMIL) file including graphic user interface (GUI) data and timing information associated with the GUI data and multimedia content from the second device through the second session, with the multimedia content comprising audio data and video data, and the GUI data being associated with the video data;
    receiving, by the first device, one or more packets including the multimedia content currently being displayed by the second device and timing information associated with the SMIL file, from the second device, through the first session;
    decoding, by the first device, the one or more packets to detect the timing information;
    parsing, by the first device, the SMIL file and extracting the timing information associated with the GUI data and the multimedia content comparing, by the first device, the timing information included in the SMIL with the timing information included in the one or more packets;
    merging and displaying, by the first device, the multimedia content and the GUI data based on the comparing the timing information included in the SMIL with the timing information inserted into the one or more packets; and
    receiving, by the first device, a message comprising a set parameter for stopping display of the GUI data from the second device and stopping display of the GUI data in response to detecting a command for stopping play of the multimedia content at the first device.

3. A first device for displaying data in a wireless communication system, the first device comprising:
    a transmitter/receiver configured to transmit or receive data; and
    at least one processor configured to:
        establish a first session corresponding to a wifi display session between the first device and a second device,
        establish a second session other than the first session between the first device and the second device
        display application data including graphic user interface (GUI) data and play multimedia content, with the multimedia content comprising audio data and video data, and the GUI data being associated with the video data,
        control transmission of a synchronized multimedia integration language (SMIL) file including the GUI data and timing information associated with the GUI data and the multimedia content, to the second device through the second session, after transmission of the SMIL file to the second device, generate one or more packets by packetizing the multimedia content currently being displayed by the first device and insert timing information associated with the SMIL file into the one or more packets, control transmission the one or more packets to the second device through the first session, control decoding the one or more packets to detect the timing information;

control parsing the SMIL file and extracting the timing information associated with the GUI data and the multimedia content;

compare the extracted timing information with timing information of the one or more packets, and control transmission of a message comprising a set parameter for stopping display of the GUI data to the second device in response to detecting a command for stopping play of the multimedia content at the first device, with the multimedia content and the GUI data being merged based on comparing the timing information included in the SMIL with the timing information inserted into the one or more packets.

4. A first device for displaying data in a wireless communication system, the first device comprising:

a transmitter/receiver configured to receive or transmit data; and at least one processor configured to:

establish a first session corresponding to a wifi display session between the first device and a second device, establish a second session other than the first session between the first device and the second device, control reception of a synchronized multimedia integration language (SMIL) file including graphic user interface (GUI) data and timing information associated with the GUI data and multimedia content from the second device through the second session, with the multimedia content comprising audio data and video data, and the GUI data being associated with the video data, control reception of one or more packets including the multimedia content currently being displayed by the second device and timing information associated with the SMIL file, from the second device, through the first session, control decoding the one or more packets to detect the timing information, control parsing the SMIL file and extracting the timing information associated with the GUI data and the multimedia content;

compare the timing information included in the SMIL with the timing information included in the one or more packets;

compare the timing information included in the SMIL with the timing information included in the one or more packets, and control reception of a message comprising a set parameter for stopping display of the GUI data from the second device and stop display of the GUI data in response to detecting a command for stopping play of the multimedia content at the first device, with the multimedia content and the GUI data being merged based on comparing the timing information included in the SMIL with the timing information inserted into the one or more packets.

* * * * *